United States Patent [19]
Ozawa

[11] Patent Number: 6,019,090
[45] Date of Patent: Feb. 1, 2000

[54] ENGINE CONTROL FOR ENGINE POWERING A WATERCRAFT

[75] Inventor: Shigeyuki Ozawa, Iwata, Japan

[73] Assignee: Yamaha Hatsudoki Kabushiki Kaisha, Japan

[21] Appl. No.: 09/084,812

[22] Filed: May 26, 1998

[30] Foreign Application Priority Data

May 23, 1997 [JP] Japan .................................. 9-133435

[51] Int. Cl.[7] ............................ F02D 17/02; F02D 41/04
[52] U.S. Cl. ................. 123/481; 123/65 PE; 123/198 F; 123/333; 123/335; 60/324
[58] Field of Search ................................ 123/198 F, 481, 123/65 PE, 332, 333, 334, 335; 60/324

[56] References Cited

U.S. PATENT DOCUMENTS

| | | | |
|---|---|---|---|
| 3,158,143 | 11/1964 | Heidner | 123/198 F |
| 3,400,702 | 9/1968 | Watkins | 123/198 F |
| 3,570,460 | 3/1971 | Rabus | 123/333 |
| 4,024,850 | 5/1977 | Peter et al. | 123/198 F |
| 4,399,788 | 8/1983 | Bostelmann | 123/65 PE |
| 4,409,938 | 10/1983 | Fujimoto et al. . | |
| 4,562,801 | 1/1986 | Koike . | |
| 4,674,458 | 6/1987 | Mori | 123/333 |
| 4,708,669 | 11/1987 | Kanno et al. . | |
| 4,768,474 | 9/1988 | Fujimoto et al. . | |
| 4,895,120 | 1/1990 | Tobinaga et al. . | |
| 4,903,662 | 2/1990 | Hirukawa et al. . | |
| 4,951,624 | 8/1990 | Hirano . | |
| 4,951,640 | 8/1990 | Hirukawa et al. . | |
| 4,965,549 | 10/1990 | Koike . | |
| 4,966,115 | 10/1990 | Ito et al. . | |
| 4,979,477 | 12/1990 | Nickel et al. | 123/335 |
| 5,060,608 | 10/1991 | Umemoto | 123/198 D |
| 5,062,401 | 11/1991 | Suganuma . | |
| 5,117,792 | 6/1992 | Kanno . | |
| 5,136,279 | 8/1992 | Kanno . | |
| 5,309,882 | 5/1994 | Hoshiba et al. . | |
| 5,387,163 | 2/1995 | Sakamoto et al. . | |
| 5,390,637 | 2/1995 | Yoshioka et al. | 123/333 |
| 5,555,871 | 9/1996 | Gopp et al. | 123/481 |
| 5,584,266 | 12/1996 | Motose et al. | 123/198 F |
| 5,645,032 | 7/1997 | Motose . | |
| 5,655,508 | 8/1997 | Nonaka . | |
| 5,669,349 | 9/1997 | Iwata et al. . | |
| 5,720,257 | 2/1998 | Motose et al. . | |
| 5,752,476 | 5/1998 | Nakamura | 123/65 PE |

FOREIGN PATENT DOCUMENTS

157033 9/1982 Japan .................................. 123/198 F

*Primary Examiner*—Willis R. Wolfe
*Assistant Examiner*—Brian Hairston
*Attorney, Agent, or Firm*—Knobbe, Martens, Olson & Bear, LLP

[57] ABSTRACT

An engine control for an engine powering a watercraft is disclosed. The engine has a body defining at least two combustion chambers. An air supply system supplies air to the combustion chambers, the air supply system including a throttle control for controlling the flow rate of air to the engine, the throttle control moveable between an open and a closed position. A fuel supply system supplies fuel to the combustion chambers. At least one ignition element ignites the air and fuel supplied to the combustion chambers. At least one exhaust passage leads from the combustion chamber to a point exterior to the body through which exhaust may pass. Exhaust control means are provided for controlling the timing of the flow of exhaust through the passage. The engine control includes means for disabling the operation of at least one of the combustion chambers at an engine speed less than an engine speed corresponding to a watercraft planing speed, means for controlling the exhaust control means to reduce the exhaust flow time when at least one combustion chamber is disabled, and means for preventing combustion chamber disabling when a rate of change in position of the throttle control towards the open position exceeds a predetermined rate.

14 Claims, 6 Drawing Sheets

ENGINE CONTROL FOR ENGINE POWERING A WATERCRAFT

FIELD OF THE INVENTION

The present invention relates to an engine control. More particularly, the invention is an engine control for a multiple cylinder engine of the type powering a personal watercraft.

BACKGROUND OF THE INVENTION

Watercraft, including personal watercraft, are often powered by an internal combustion engine having an output shaft arranged to drive a water propulsion device. The engine which is used to power a personal watercraft often operates on a two-stroke operating cycle.

One problem associated with these engines is that when running at a low speed their exhaust content is fairly undesirable. For example, some unburned fuel may be contained in the exhaust which is directly exhausted into the atmosphere or water. In addition, the rate of fuel consumption of the engine at low speed is often high in relation to the required power output of the engine.

As one means to improve the exhaust content at low speed, the air/fuel ratio may be controlled by reducing the fuel delivery rate. In this manner, the fuel consumption rate is decreased and the exhaust content is improved.

This solution gives rise to its own problems, however. First, these two-cycle engines are known to run fairly rough at low speeds, including idle. A reduction in the fuel delivery rate may exacerbate this problem. In addition, if sudden acceleration of the engine is desired, the engine may stall.

An engine control for an engine of the type utilized to power a watercraft which is arranged to overcome the above-stated problems is desired.

SUMMARY OF THE INVENTION

In accordance with the present invention there is provided an engine control for an engine powering a watercraft. The engine has a body defining at least two combustion chambers. An air supply system supplies air to the combustion chambers, the air supply system including a throttle control for controlling the flow rate of air to the engine, the throttle control moveable between an open and a closed position. A fuel supply system supplies fuel to the combustion chambers. At least one ignition element ignites the air and fuel supplied to the combustion chambers. At least one exhaust passage leads from the combustion chamber to a point exterior to the body through which exhaust may pass. Exhaust control means are provided for controlling the timing of the flow of exhaust through the passage.

The engine control includes means for disabling the operation of at least one of the combustion chambers at an engine speed less than an engine speed corresponding to a watercraft planing speed. Preferably, the engine control also includes means for controlling the exhaust control means to reduce the exhaust flow time when at least one combustion chamber is disabled, and means for preventing combustion chamber disabling when a rate of change in positioned of the throttle control towards the open position exceeds a predetermined rate.

Further objects, features, and advantages of the present invention over the prior art will become apparent from the detailed description of the drawings which follows, when considered with the attached figures.

BRIEF DESCRIPTION OF THE DRAWINGS

FIG. 6($b$) is a graph illustrating the number of running cylinders in relation to throttle opening speed; and FIG. 6($c$) is a graph illustrating the number of running cylinders in relation to engine speed and the opening area or positioned of an exhaust control valve associated with each cylinder in relation to engine speed.

DETAILED DESCRIPTION OF THE PREFERRED EMBODIMENTS OF THE INVENTION

The present invention is an engine control for an engine of the type utilized to power a watercraft, and more particularly, a personal watercraft.

Figure 1:
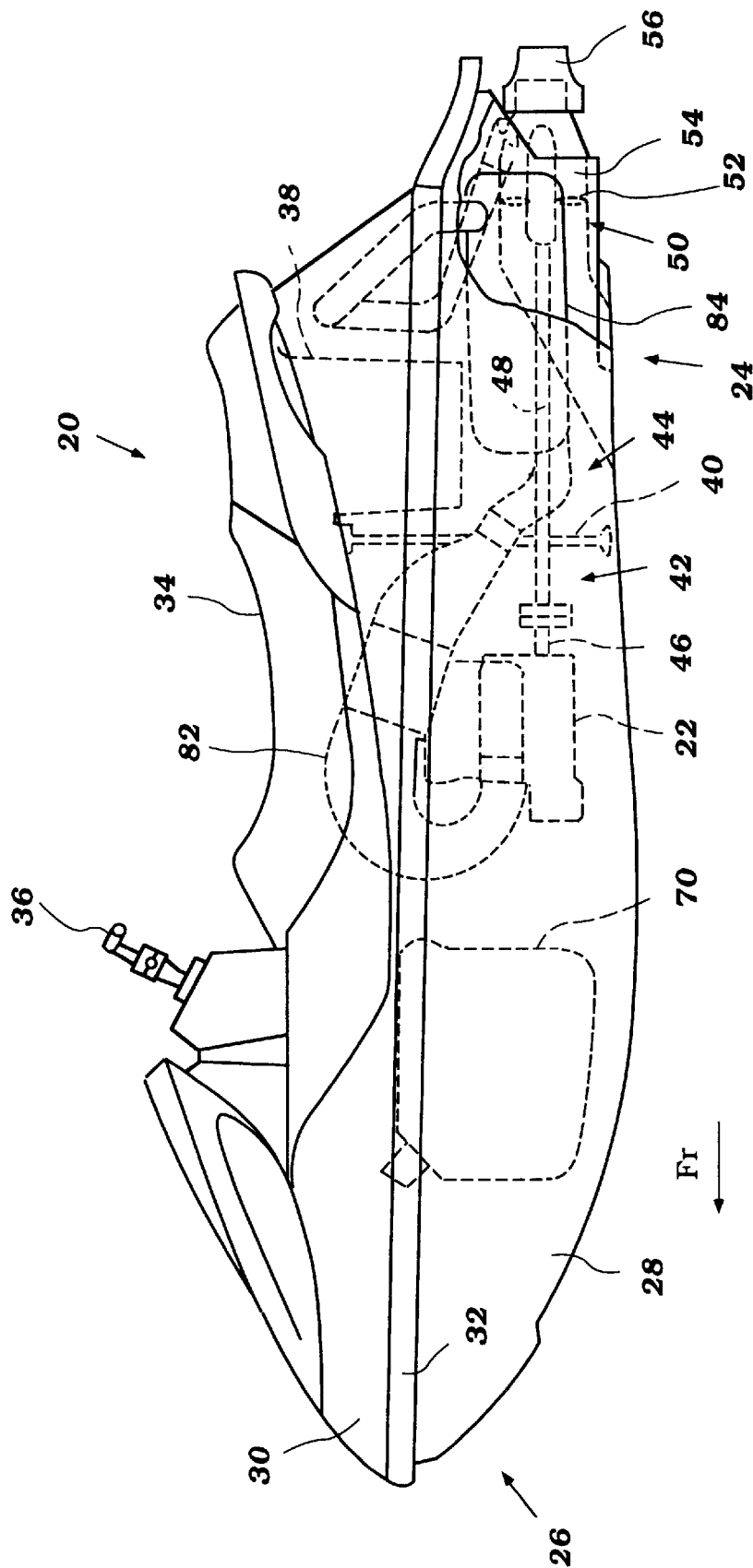
FIG. 1 is a side view of a personal watercraft of the type powered by an engine having an engine control in accordance with the present invention, the engine and other watercraft components positioned within the watercraft illustrated in phantom.
Figure 2:
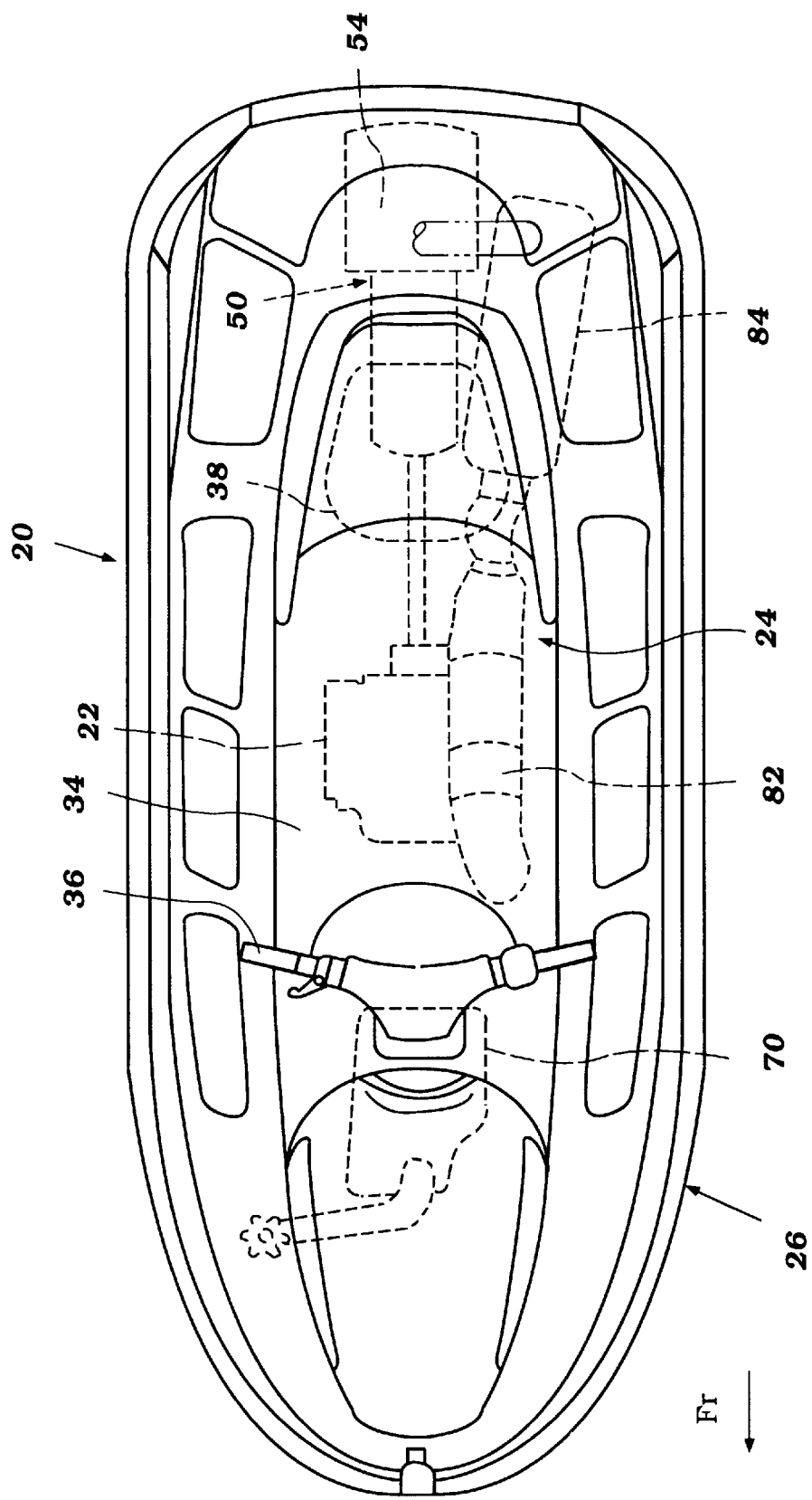
FIG. 2 is a top view of the watercraft illustrated in FIG. 1, with the engine and other watercraft components positioned within the watercraft illustrated in phantom.

FIGS. 1 and 2 illustrate a watercraft 20 having a hull 26 having a top portion or deck 28 and a lower portion 30. A gunnel 32 defines the intersection of the hull 26 and the deck 28.

A seat 34 is provided adjacent a steering handle 36. The seat 34 may be connected to a removable deck member for providing access to an engine compartment, described in more detail below. The steering handle 36 is preferably arranged for use by a user in directing the watercraft 20.

The construction of the watercraft 20 proper will not be described in detail as such is well known to those of skill in the art. As such, the watercraft 20 may include a variety of features not illustrated or described. For example, and as illustrated in FIG. 1, the watercraft 20 may include one or more storage boxes 38. This box 38 may be positioned underneath a rear portion of the seat 34 and be accessible by removing the seat.

The top and bottom portions 28,30 of the hull 26, along with a bulkhead 40, define an engine compartment 42 and a pumping chamber 44. An engine 22 is positioned in the engine compartment 42. The engine 22 has a crankshaft 46 which is in driving relation with an impeller shaft 48. The impeller shaft 48 rotationally drives a means for propelling water of a propulsion unit 24.

The propulsion unit 24 preferably comprises a water-jet type pump 50 comprising an impeller 52 positioned in a propulsion passage 54. The impeller 52 is driven by the impeller shaft 48 and arranged to draw water through an inlet of the propulsion passage 54 and discharge it at high velocity through an outlet of the passage 54 into a nozzle 56. The nozzle 56 is mounted for movement (via the steering handle 36), whereby the direction of the propulsion force for the watercraft 20, and thus the direction of the watercraft 20, may be varied.

Figure 3:
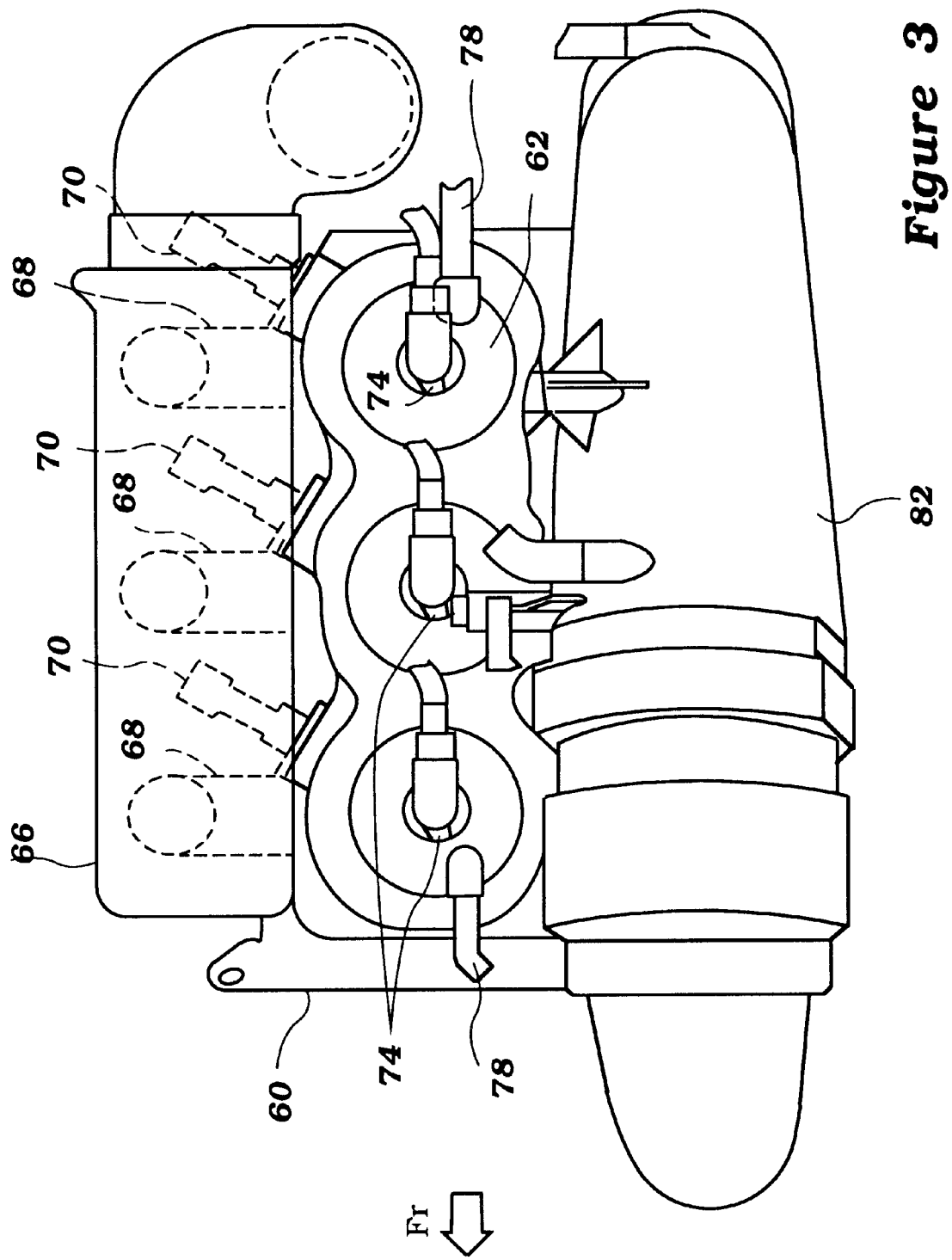
FIG. 3 is a top view of the engine powering the watercraft illustrated in FIGS. 1 and 2.
Figure 4:
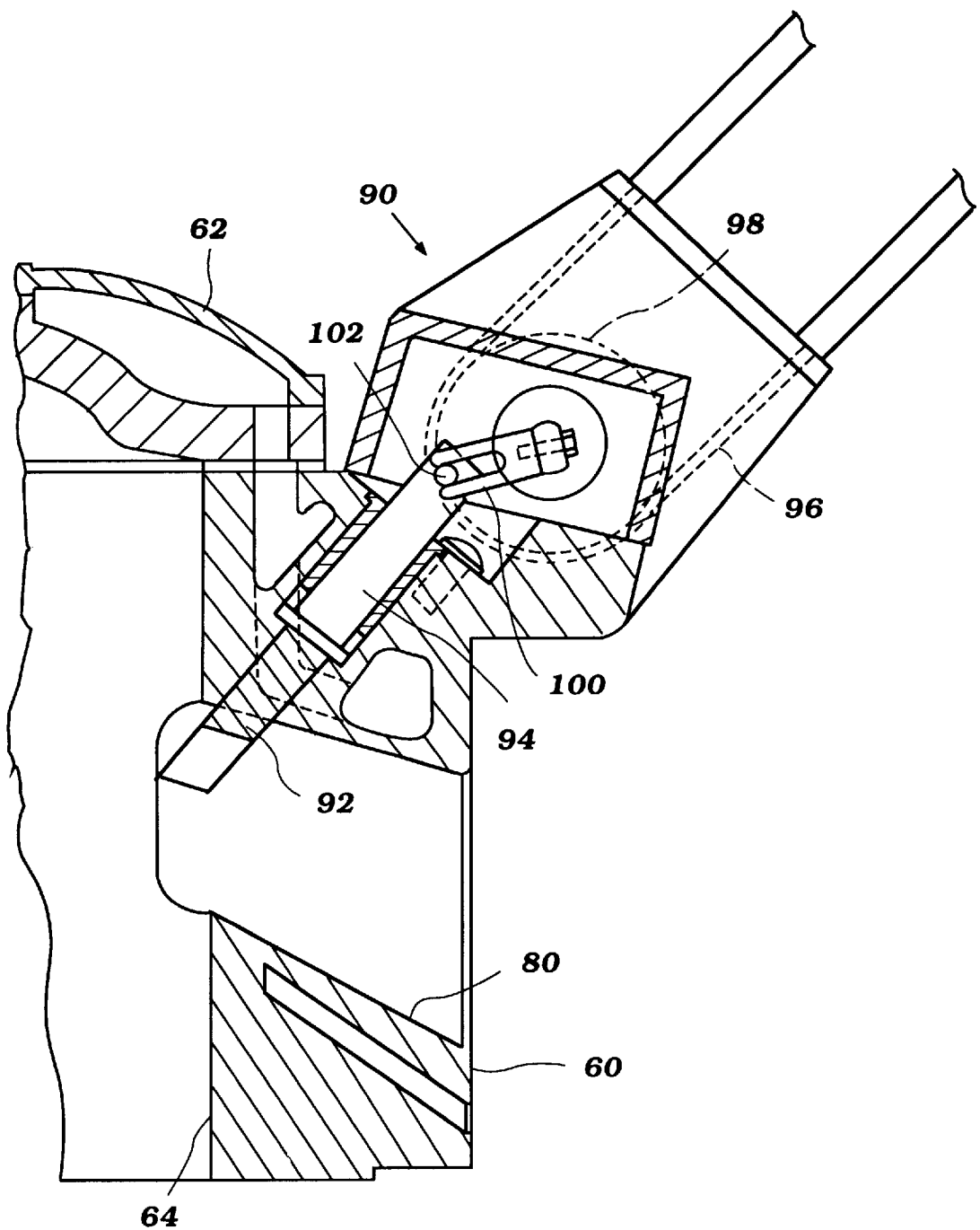
FIG. 4 is a partial cross-sectional view of the engine illustrated in FIG. 3, illustrating an exhaust control associated with the engine control of the present invention.

The engine 22 is best illustrated in FIGS. 3 and 4. The engine 22 is preferably of the internal combustion type having three cylinders and operating on a two-cycle principle. Of course, the engine 22 may have as few as one, or more than three cylinders, as may be appreciated by one skilled in the art, and may operate on other than a two-cycle principle.

The engine 22 includes a cylinder block or body 60 having three cylinders 64 therein. A cylinder head 62 is connected to the cylinder block 60 and cooperates therewith to define a combustion chamber corresponding to each cylinder 64. A piston (not shown) is movably mounted in each cylinder 64, and connected to the crankshaft 46 via a connecting rod, as is well known in the art.

The crankshaft 46 is partially mounted for rotation within a crankcase portion of the engine 22. As illustrated in FIG. 1, the crankshaft 46 extends outwardly of the crankcase at a rear end of the engine 22 to its coupling with the impeller shaft 48.

As best illustrated in FIG. 3, the engine 22 includes means for providing an air and fuel mixture to each combustion chamber. Preferably, air is drawn into the engine compartment 42 through one or more air inlets in the hull 26. Air is then drawn into an intake box 66. Air then flows from this box 66 through an intake pipe 68 corresponding to each cylinder 64 to a crankcase chamber.

Preferably, a throttle control (not shown) is provided for controlling the rate of flow of air to the engine 22. The throttle control preferably includes a throttle valve or plate for controlling the flow of air through a portion of the intake system (such as the intake pipes 68 or a central air passage leading to the intake box 66) to the engine 22. A throttle lever (not shown) is preferably provided adjacent to or on the steering handle 34 for use by the operator of the watercraft 20 in controlling the throttle position.

The crankcase chamber is compartmentalized so as to provide the crankcase compression feature for each combustion chamber as is well known in the operation of two-cycle engines. Preferably, a one-way reed type valve is provided at the intake port between the intake pipe and each compartment of the crankcase for permitting air to flow only in the direction of the engine 22 and not back towards the intake box 66.

Air in each crankcase chamber is compressed by the downward movement of the piston of its corresponding cylinder 64 and then delivered through a scavenge passage (not shown) to the cylinder 64. Upon the upstroke of the piston, a fresh charge of air is drawn into the crankcase compartment through the appropriate intake pipe 68.

Fuel is provided to each cylinder 64. In particular, fuel is drawn from a fuel tank 70 (see FIG. 1) positioned in the engine compartment 42 by a suitable fuel delivery system. As illustrated, this fuel delivery system preferably includes a fuel injector 72 corresponding to each cylinder 64. Fuel is supplied at high pressure to each injector 72, with each injector arranged to deliver the fuel to a respective cylinder 64. Those of skill in the art will appreciate that the fuel system may be arranged with indirect injection and with more than one or less than one injector per cylinder. The fuel may be delivered by carburation or other means as well.

An ignition system is provided for igniting the air and fuel mixture provided to each cylinder 64. Preferably, this system includes a spark plug 74 (see FIG. 4) corresponding to each cylinder 64. The spark plugs are preferably fired by a suitable ignition system.

Though not illustrated, the engine 22 preferably includes a suitable lubricating system for providing lubricating oil to the various moving parts thereof. The engine 22 also preferably includes a suitable cooling system. Preferably, the cooling system is a liquid cooling system which draws cooling water from the body of water in which the watercraft 20 is being operated and circulates it through various cooling water jackets in the cylinder block 60, head 62 and other components. As illustrated, the cooling system includes cooling outlet pipes 78 through which the coolant flows after passing through the water jackets in the cylinder block 60 and head 62.

Referring first to FIG. 4, and also to FIGS. 1–3, exhaust gas generated by the engine 22 is routed from the engine to a point external to the watercraft 20 by an exhaust system which includes an exhaust passage 80 leading from each cylinder 64 through the cylinder block 60. The exhaust is then routed through an appropriate exhaust pipe 82 connected to the cylinder block 60, this exhaust pipe 62 arranged to merge the exhaust gas from each passage 80 and route it away from the engine.

The exhaust pipe 82 extends to a water lock 84 positioned near the rear of the watercraft 20. After passing through the water lock 84, which serves to prevent the reverse flow of water through the exhaust system to the engine 22, the exhaust is routed into the water in which the watercraft 20 is operating. Though not illustrated, the exhaust system may include a catalyst may be positioned along the exhaust system for reducing the harmful emission content.

As illustrated in FIG. 3, the engine 22 is preferably arranged so that the exhaust system and intake system are generally positioned on opposite sides of the cylinder block 60, providing for a compact and balanced engine arrangement.

Means are provided for controlling the flow of exhaust gases through each exhaust passage 80 from the respective cylinders 64. Preferably, this means comprises an exhaust timing control device 90. In the embodiment illustrated, the exhaust timing control device 90 comprises a sliding knife type valve 92 and means for moving the valve.

As illustrated in FIG. 4, the valve 92 has a body having one end positioned in the exhaust passage 80 and an opposing stem portion 94. The portion of the valve 92 positioned in the exhaust passage 80 is shaped such that when the valve 92 is retracted it cooperates with the cylinder block 60 to define a smooth exhaust passage 80.

As illustrated, the valve 92 is mounted to the block 60. In particular, a guide or passage extends through the block 60 from a top side adjacent the cylinder head 62 into the exhaust passage 80. The valve 92 is slidably positioned in this passage.

So arranged, the valve 92 is moveable between a first position and a second position. In a first position, the body of the valve 92 is moved downwardly so that it extends into the exhaust passage 80, partially blocking it. This has the effect of delaying the time the exhaust starts to pass from the cylinder 64 to the exhaust passage 80 (as the piston moves downwardly from top dead center) and has the effect of causing the exhaust to stop flowing earlier (as the piston moves upwardly) as compared to the second position of the valve 92. In the second position, the valve 92 does not obscure, or at least obscures less as compared to its first position, of the passage 80. In this position, the exhaust flow starts earlier and lasts longer.

As state above, means are provided for moving the valve 92 between its first and second positions. Preferably, this means comprises an actuating device, illustrated only partially. This device includes a wire or similar cable 96 which drives a driven pulley 98. The cable 96 may be driven by a motor driving a driving pulley (not shown) or other mechanism known to those of skill in the art.

An arm 100 is connected to the driven pulley 98. The arm 100 has a slot for accepting a pin 102 extending from the top end of the stem 94 of the valve 92. In this arrangement, when the motor moves the drive pulley in a first direction, the cable 96 moves in the same direction, rotating the driven pulley 98. Rotation of the driven pulley 98 causes the arm 100 to move the pin 102, and thus the valve 92. Of course, if the motor causes the drive pulley to move in the opposite direction, the valve 92 is moved in the opposite direction. In this manner, the valve 92 is moved between its first and second positions.

A valve 92 and appropriate drive mechanism is provided corresponding to each of the passages 80. A separate motor and drive mechanism may be provided for each valve 92, or a single drive mechanism may be arranged to drive all valves 92, as will be apparent to those of skill in the art.

Figure 5:
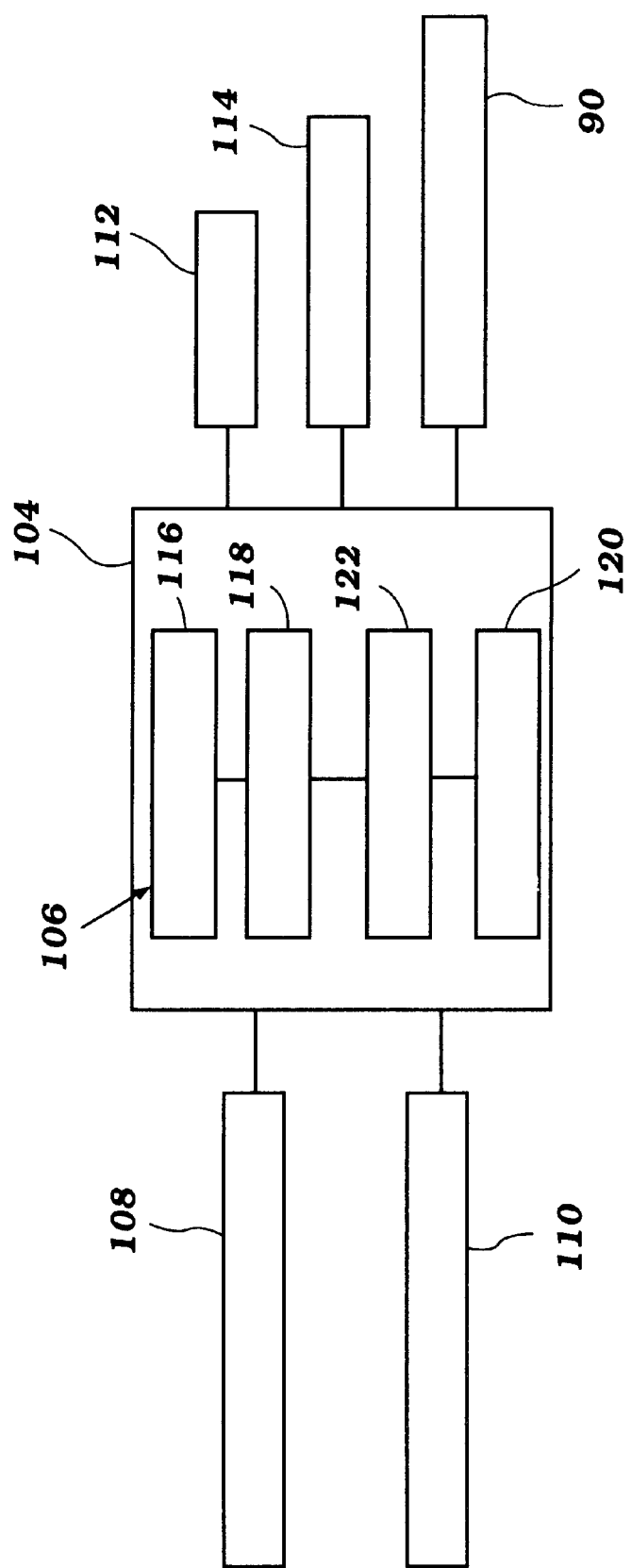
FIG. 5 is a block diagram of the engine control of the present invention.

Referring to FIG. 5, a control, such as an engine control unit (ECU) 104 is provided for controlling various functions associated with the engine 22, such as the drive mechanism for the exhaust timing control valves.

Still referring to FIG. 5, the ECU 104 includes a central processing unit (CPU) 106. A variety of sensors provide information to the ECU 104 for use in controlling the engine 22. For example, an engine speed sensor 108 and a throttle position sensor 110 are arranged to provide engine speed and throttle position information to the ECU 104.

The ECU 104 is arranged to control such features as the ignition system 112, fuel injection system 114 and exhaust timing control system 90. For example, the ECU 104 is preferably arranged to control the firing timing of the spark plugs 74 associated with the ignition system 114 and to control the fuel injection timing and amount with the injectors 70. In addition, the ECU 104 is arranged to control the movement of the exhaust timing control valves 92 as described above.

In the embodiment illustrated, the CPU 106 includes an ignition control means 116, fuel injector control means 118 and exhaust timing control means 120 for this purpose. In addition, the CPU 106 preferably includes an engine running mode control means 122 as described in more detail below.

The engine control, and more particularly the ECU 104, is preferably arranged to control the various features or functions of the engine 22 as illustrated in FIGS. 6(a–c).

Figure 6A:
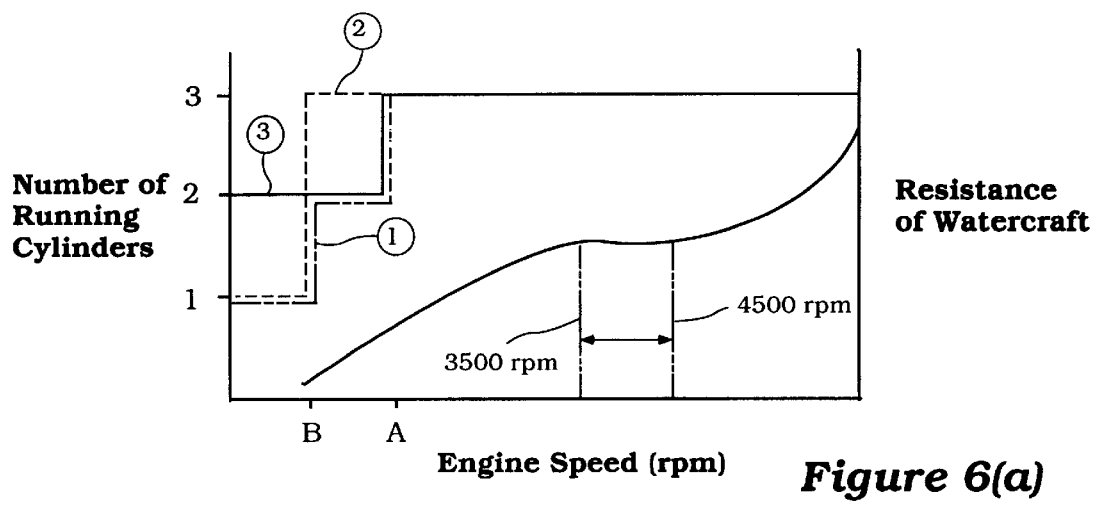
FIG. 6($a$) is a graph illustrating the number of running cylinders as controlled by the engine control of the present invention in relation to engine speed and watercraft resistance.

Referring to FIG. 6(a), this type of watercraft 20 has an operating resistance (due primarily to the friction between the water and hull) which increases first as engine speed (and thus watercraft speed) increases, then levels off as the watercraft planes, and then begins to increase again as the engine (and thus watercraft speed) further increase.

In accordance with the present invention, the engine running mode control means 122 is provided with at least a normal mode and a disabling mode of control. In accordance with the disabling mode, at least one or more, but not all, of the cylinders 64 are prevented from operating at a low engine speed. This speed is an engine speed which corresponds to a speed of the watercraft before it planes (ex. 3500 rpm in FIG. 6(a)). In this case, the one or two cylinders 64 which are prevented from operating may be prevented from operating by either disabling the ignition system (i.e. not firing the spark plug or misfiring the timing of the spark plug) or fuel system with respect to that cylinder 64 to be disabled. If the fuel system is the mechanism for disabling the cylinder 64, a small amount of fuel is preferably still provided to the cylinder 64 for use in cooling the fuel injector 70 and preventing damage thereto. Preferably, the rate of fuel delivery to the cylinder(s) to be disabled is reduced to lower fuel consumption and reduce exhausting of unburned fuel.

In one arrangement, illustrated by line 1 in FIG. 6(a), all but one cylinder is disabled below a predetermined engine speed B, only one cylinder is disabled between the engine speed B and a predetermined higher speed A, and no cylinders are disabled (i.e., a normal mode) when the engine speed exceeds speed A. In this arrangement, engine speeds A and B are both below the engine speed corresponding to planing and preferably above an idle speed of the engine.

In a second arrangement, illustrated by line 2 in FIG. 6(a), all but one cylinder is disabled if the engine speed is below speed B and no cylinders are disabled if the engine speed exceeds speed B.

In a third arrangement, illustrated by line 3, only a single cylinder is disabled when the engine speed is less than speed A and no cylinders are disabled if the engine speed exceeds A.

Those of skill in the art will appreciate that the above-described control strategy may be employed in an engine having more than three cylinders in a similar manner.

In accordance with this control strategy, the disabling of one or more of the cylinders of the engine 22 at low engine speed improves fuel economy, improves emissions, and provides for smoother engine running. On the other hand, all cylinders are operated when high power is needed to plane the watercraft 20.

Figure 6B:
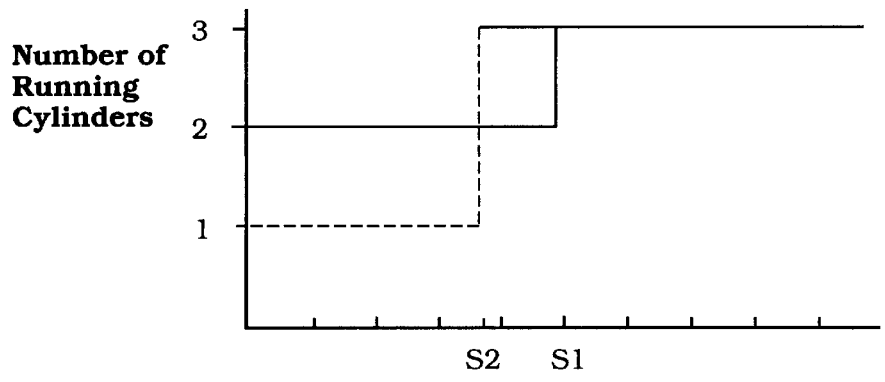

In accordance with the present invention, the engine control is preferably arranged to alter the cylinder disabling strategy in accordance with throttle opening speed. As illustrated in FIG. 6(b), in the event the throttle opens very quickly, indicating a desire to rapidly increase engine and watercraft speed, the engine control is arranged to increase the number of running or operating cylinders 64. In one arrangement, the engine control may be arranged so that below one rate of opening speed S2 up to all but one cylinder may be disabled, and above that speed no cylinders are disabled. Alternatively, the engine control may be arranged so that below one higher rate of opening speed S1 one cylinder may be disabled and above than speed no cylinders are disabled. In this manner, while cylinder disabling may be used to provide the above-described benefits, the engine control is arranged to control the engine to provide the desired power (as indicated by a quick change in throttle position).

Figure 6C:
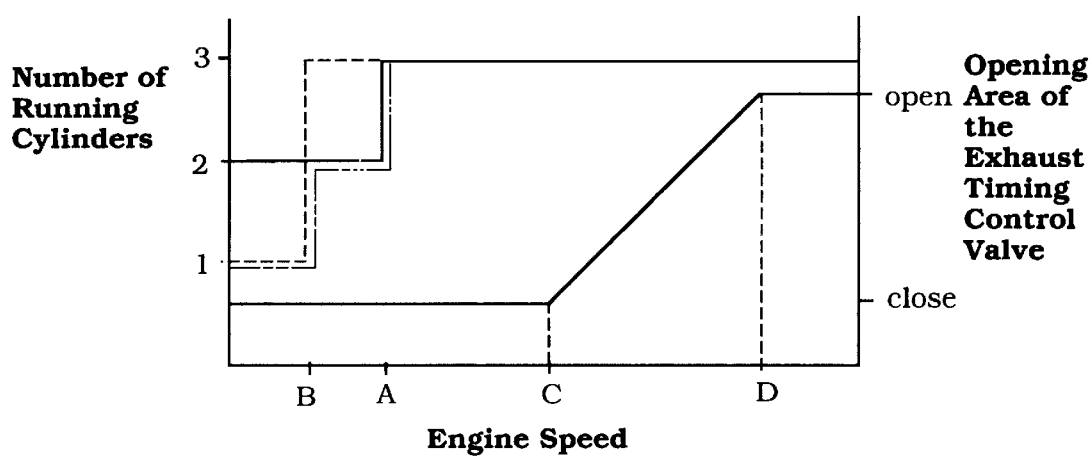

In accordance with the present invention, the engine control is preferably also arranged to control the exhaust timing control valves 92. FIG. 6(c) illustrates the preferred control strategy for the exhaust timing control valves 92. At a low engine speed (below a speed C which exceeds speeds A and B described above) the exhaust timing control valve 92 corresponding to each cylinder 64 is preferably moved to a closed position (i.e. that position in which the valve 92 extends substantially into the exhaust passage 80 and obscures the passage). Above this preset engine speed C the valves 92 are moved to their open position in relation to increasing engine speed, such that the valves 92 move to their fully open (i.e. retracted) position when the engine speed is a high speed D.

In this arrangement, when the engine speed is low and one or more of the cylinders 64 may be disabled, a good compression ratio and longer compression are obtained in the running or non-disabled cylinders because the exhaust valve 92 is closed (providing for a later start to exhaust flow from the cylinder 64 and an early closing of the exhaust passage 80 during compression).

In addition, the engine control of the present invention is preferably arranged to control which cylinder(s) is disabled. For example, one or more cylinders 64 may be disabled at a low engine speed to reduce the temperature of that cylinder. For example, referring to FIG. 1, the engine control may be arranged to disable the front-most cylinder of the engine 22 when the engine speed is low. Because this cylinder 64 is not operating, its temperature decreases, reducing the heat transfer from the engine 22 to the fuel tank 70 which is positioned forward thereof. The engine control may be arranged to disable the cylinder(s) 64 to reduce the heat transfer to other components, such as the accessory box 38 as well.

Another advantage is that the engine control may be used to disable the cylinder(s) 64 to cool them in relation to the cooling capability of the cooling system associated with the engine, whereby maximum engine cooling may be realized. In the embodiment illustrated in FIG. 3, coolant preferably flows through water jackets in the cylinder block 60 and head 62 and then exits through a discharge at the front and rear of the engine 22 before extending to an exhaust manifold water jacket or the like.

In this arrangement, the cooling system most effectively cools the front and rear cylinders 64 as compared to the middle cylinder due to the arrangement of the cooling system. Thus, the engine control may be arranged to first disable the central or middle cylinder 64 at low engine speeds so that this middle cylinder 64 remains cool and to improve the cooling of the adjacent front and rear cylinders.

While the exhaust timing control valve described herein is of the sliding-knife type, those of skill in the art will appreciate that other means may be used to control the timing of the flow of exhaust from each cylinder 62. For example, the valve may be of the rotating type, in which in one position the valve extends into the exhaust passage and partially obscures it and in a second position rotates to a position in which little if any of the passage is obscured.

Of course, the foregoing description is that of preferred embodiments of the invention, and various changes and modifications may be made without departing from the spirit and scope of the invention, as defined by the appended claims.

What is claimed is:

1. An engine control for an engine powering a watercraft, said engine having a body defining at least two combustion chambers, an air supply system for supplying air to said combustion chambers, a fuel supply system for supplying fuel to said combustion chambers, at least one ignition element for igniting said air and fuel in said combustion chambers, said engine having an output shaft arranged to drive a water propulsion device of said watercraft, said engine control including means for selectively controlling engine speed in a speed range including speeds above idle speed by disabling at least one of said combustion chambers at an engine speed corresponding to an engine speed within said speed range and below a watercraft planing speed, and means for preventing combustion chamber disabling as said engine speed increases to said engine speed corresponding to watercraft planing speed.

2. An engine control for an engine powering a watercraft, said engine having a body defining at least two combustion chambers, an air supply system for supplying air to said combustion chambers, a fuel supply system for supplying fuel to said combustion chambers, at least one ignition element for igniting said air and fuel in said combustion chambers, said engine having an output shaft arranged to drive a water propulsion device of said watercraft, said engine control including means for selectively disabling at least a combustion chamber which is closest to a component of said watercraft to which a reduced heat transfer rate is desired at an engine speed corresponding to an engine speed below a watercraft planing speed, and means for preventing combustion chamber disabling as said engine speed increases to said engine speed corresponding to watercraft planing speed.

3. An engine control for an engine powering a watercraft, said engine having a body defining at least two combustion chambers, an air supply system for supplying air to said combustion chambers, a fuel supply system for supplying fuel to said combustion chambers, at least one ignition element for igniting said air and fuel in said combustion chambers, said engine having an output shaft arranged to drive a water propulsion device of said watercraft, said engine includes a cooling system, said engine control including means for selectively disabling at least a combustion chamber which is cooled least efficiently by said cooling system at an engine speed corresponding to an engine speed below a watercraft planing speed, and means for preventing combustion chamber disabling as said engine speed increases to said engine speed corresponding to watercraft planing speed.

4. An engine control for an engine powering a watercraft, said engine having a body defining at least two combustion chambers, an air supply system for supplying air to said combustion chambers, a fuel supply system for supplying fuel to said combustion chambers, at least one ignition element for igniting said air and fuel in said combustion chambers, said engine having an output shaft arranged to drive a water propulsion device of said watercraft said engine includes a cooling system, said engine control including means for selectively disabling at least a combustion chamber which results in the greatest cooling rate by said cooling system of said remaining combustion chambers at an engine speed corresponding to an engine speed below a watercraft planing speed, and means for preventing combustion chamber disabling as said engine speed increases to said engine speed corresponding to watercraft planing speed.

5. The engine control in accordance with claim 1, wherein said means for selectively disabling disables said at least one combustion chamber by preventing the firing of said at least one ignition element corresponding thereto.

6. The engine control in accordance with claim 1, wherein said means for selectively disabling disables said at least one combustion chamber by misfiring said at least one ignition element corresponding thereto.

7. The engine control in accordance with claim 1, wherein said means for selectively disabling disables said at least one combustion chamber by reducing the rate at which fuel is delivered thereto by said fuel supply.

8. An engine control for an engine powering a watercraft, said engine having a body defining at least two combustion chambers, an air supply system for supplying air to said combustion chambers, a fuel supply system for supplying fuel to said combustion chambers, at least one ignition element for igniting said air and fuel in said combustion chambers, said engine having an output shaft arranged to drive a water propulsion device of said watercraft, a throttle control for controlling the rate at which air is delivered by said air supply to said combustion chamber, said throttle control having an open position and a closed position, said engine control including means for selectively disabling at least one of said combustion chambers for controlling the speed of said engine at least in a speed range above idle speed, said engine control includes means for preventing disabling of said combustion chambers in said speed range when said throttle control is moved towards said open position at an opening rate above a predetermined speed.

9. An engine control for an engine powering a watercraft, said engine having a body defining at least two combustion chambers, an air supply system for supplying air to said combustion chambers, a fuel supply system for supplying fuel to said combustion chambers, at least one ignition element for igniting said air and fuel in said combustion chambers, said engine having an output shaft arranged to drive a water propulsion device of said watercraft, an exhaust passage leading from each combustion chamber through said body to a point external thereto, said engine control including means for selectively disabling at least one of said combustion chambers at an engine speed corresponding to an engine speed below a watercraft planing speed and means for delaying the flow of exhaust from each combustion chamber which is not disabled when at least one combustion chamber is disabled.

10. An engine control for an engine powering a watercraft, said engine having a body defining at least two combustion chambers, an air supply system for supplying air to said combustion chambers, said air supply system including a throttle control for controlling the flow rate of air to said engine, said throttle control moveable between an open and a closed position, a fuel supply system for supplying fuel to said combustion chambers, at least one ignition element for igniting said air and fuel supplied to said combustion chambers, at least one exhaust passage leading from said combustion chamber to a point exterior to said body through which exhaust may pass, exhaust control means for controlling the timing of the flow of exhaust through said passage, said engine control including means for disabling the operation of at least one of said combustion chambers at an engine speed less than an engine speed corresponding to a watercraft planing speed and means for controlling the exhaust control means to reduce the exhaust flow time when at least one combustion chamber is disabled.

11. The engine control in accordance with claim 10, wherein said exhaust control means comprises a sliding-knife type valve.

12. The engine control in accordance with claim 10, wherein said engine control includes means for sensing a position of said throttle control.

13. The engine control in accordance with claim 10, wherein said engine control includes means for sensing a speed of said engine.

14. The engine control in accordance with claim 10, including means for preventing combustion chamber disabling when a rate of change in position of said throttle control towards said open position exceeds a predetermined rate.

* * * * *